July 31, 1956     L. J. PAGE     2,756,631

OPHTHALMIC MOUNTINGS

Filed Dec. 12, 1951

INVENTOR

Louis J. Page

United States Patent Office 2,756,631
Patented July 31, 1956

2,756,631

OPHTHALMIC MOUNTINGS

Louis J. Page, Hollis, N. Y.

Application December 12, 1951, Serial No. 261,175

3 Claims. (Cl. 88—47)

This invention relates to improvements in ophthalmic mountings. The improvement resides in the novel means of attaching the lenses to the mounting.

One of the principal objects of the invention is to provide a mounting in which the lenses can be readily removed and replaced by the wearer, whereby a single pair of lenses can be inserted in any chosen one of various colors of mountings or a single mounting can be employed for a pair of lenses for different purposes, such as, distant or near vision lenses, bifocal lenses, colored lenses or for other purposes. This is accomplished by a device wherein the lenses are supported by pliable frame members being urged into a tensional grip by auxiliary spring members.

Another object is to provide a mounting having the ruggedness of a plastic frame and the advantages of the semi-rimless for unobstructed vision.

Another object is to provide a mounting in which the lenses will be protected against breakage and be maintained against wobble or looseness. Mountings of the so-called semi-rimless tensional type usually have brackets of metal engaging notches in the lenses. The disadvantage of this arrangement is that the lenses easily chip at the notches. This invention overcomes this disadvantage by providing a pliable notch engaging part which will yield and cushion the lens.

Another object is to provide a mounting for which the processing of the lenses does not require great skill or accuracy to fit them therein for an acceptable finished product.

Another object is to provide a simple, efficient and practical device of the character described wherein under normal use will withstand abuse and maintain the lenses in good condition.

These and other objects and advantages reside in the combination of such novel features of construction which will be more fully understood from the accompanying drawing and the following description and claims.

Referring to the drawing.

Figure 1:
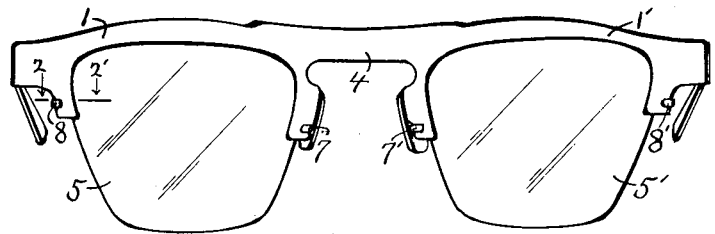
Figure 1 is a front elevation of the mounting embodying the invention.
Figure 2:
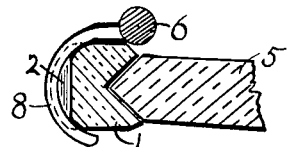
Figure 2 is a fragmentary enlarged sectional view taken as on line 2—2' of Figure 1.
Figures 3, 4:
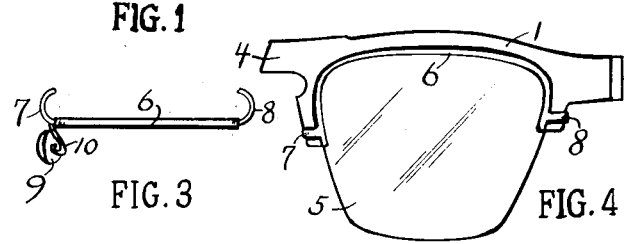
Figure 3 is a plan view of the spring auxiliary rim member disengaged from the main rim member.
Figure 4 is a fragmentary rear elevation of the mounting shown in Figure 1.
Figures 7, 8:
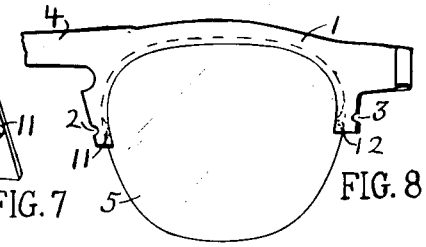
Figure 7 is a fragmentary enlarged perspective view of a part of the rim member shown in Figure 8.
Figure 8 is a view similar to Figure 4 of a modified form of the invention, the auxiliary rim member being removed.

In the drawing there is illustrated an eyeglass frame which comprises a pair of spaced pliable rim members 1, 1' having the nasal and temporal side portions of each member converging downwardly. A bridge 4 connects the rim members 1, 1'. A pair of lenses 5, 5' are processed to be adapted to fit the rim members 1, 1' respectively. Each rim member is grooved to nest the lens as shown in Figure 2 and is provided with notches 2 and 3 as shown in Figure 8. A spring auxiliary rim member 6 is shaped to follow the contour edge of that portion of the lens engaging the rim member 1. The auxiliary rim member 6 as shown in Figure 3 is provided with a nose pad 9, connected thereto by the arm 10. A pair of brackets 7, 8 are arranged to engage in the notches 2 and 3 of the rim member 1 when positioned as shown in Figure 4. The brackets 7 and 8 have an initial set relative to each other less than the distance between the notches 2 and 3 in the rim member. The spring action of the auxiliary rim member 6 constantly urges the converging side portions of the pliable rim member 1 against the edges of the lens in contact therewith maintaining the lens therein. The lens is removed from the rim member by pulling the lens downwardly. As the lens is forced downward the nasal and temporal side portions of the rim member being urged against the edge of the lens by the spring auxiliary rim member will yield allowing the wider upper portion of the lens to pass through the converging side portions of the rim member.

In Figure 8 is shown a modified form of the invention where instead of having the nasal and temporal portions of the rim member 1 converging downwardly, the grooved inner portion of the rim member 1 is provided with elevations 11 and 12. In Figure 7 the elevation 11 is shown in relation to groove in the rim member 1. The lens 5 is provided with a bevel 15 and notches 13 and 14 as shown in Figure 9.

The notches are arranged to engage the elevations 11 and 12 when lens is inserted in the groove of the rim member 1. The auxiliary spring member 6 (not shown) is adapted to engage the notches 2 and 3 in the rim member 1 thereby urging the elevations 11 and 12 into tensional engagement with the notches 13 and 14 in the lens 5. It is preferable to have the upper and lower corners of the notches rounded so that the lens can be forced in and out over the elevations in the rim member without causing undue wear thereto.

Figure 6:
Figure 6 is a fragmentary enlarged sectional view taken as on line 6, 6' of Figure 5.
Figures 9, 10:
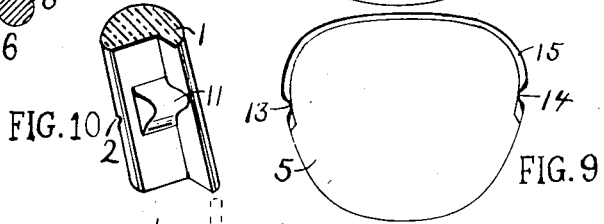
Figure 9 is a rear plan view of the lens shown in Figure 8.
Figure 10 is a view similar to Figure 7 of a modified form of the rim member.

In Figure 10 is shown a modification of the rim member 1. The grooved portion of the rim member 1 in contact with the lens 5 is L shaped. The elevation 11 and the notch 2 are shown in relation to the rim member 1. In this arrangement the edge of the lens in contact with the rim member is not beveled, but conforms substantially to the shape of the rim portion thereon as shown in Figure 6.

Figure 5:
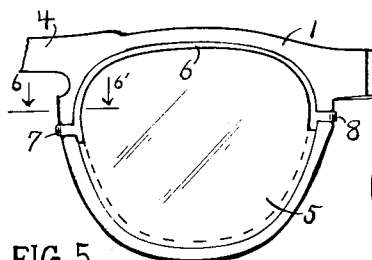
Figure 5 is a view similar to Figure 4 of a modified form of the invention.

In Figure 5 is shown another modification in which the rim member 1 is continuous and goes around the lens. The grooved portion of the rim member 1 is L-shaped. The lens 5 is inserted in the rim member 1 from the rear and contained therein by the spring auxiliary rim member 6. The relationship of the rim member 1, lens 5 and auxiliary rim member 6 is shown in Figure 6. The auxiliary rim member 6 is provided with brackets 7 and 8 which engage notches in the rim member 1 provided therein. In this arrangement the lens can be removed by pressing the bottom edge of the lens rearwardly and pulling downwardly or the auxiliary rim member can be disengaged and the lens pressed rearwardly.

Figures 11, 12:
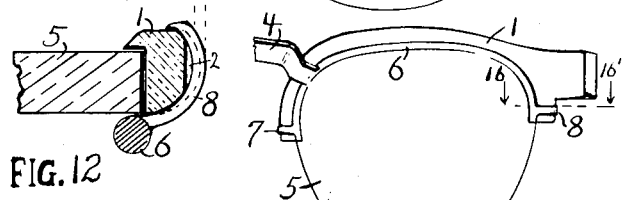
Figure 11 is a view similar to Figure 4 of a modified form of the invention.
Figure 12 is a fragmentary enlarged sectional view taken as on line 16, 16' of Figure 11.

In Figure 11 is shown another modification in which the bridge 4 is attached to the auxiliary rim member 6. The lenses are supported similarly to the means employed in the forms shown in Figures 4 and 8.

In Figure 12 is shown the bracket extending straight forward in which form the bracket 8 can be supplied. The bracket 8 is inserted in the notch in the rim member 1, and while pressing the auxiliary rim member 6 against the rear surface of the lens the bracket is bent over the front surface of the rim member. The surplus bracket overlying the rim member is cut off leaving a portion thereon as shown. The depth of the leg of the L-shaped portion of the rim corresponding to the thickness of the lens is sufficiently narrow to accommodate the thinnest edge thickness of a lens. Lenses of greater thickness are accommodate by bending the brackets after the lens is inserted and the auxiliary rim member is positioned at the rear of the lens.

Figure 13:
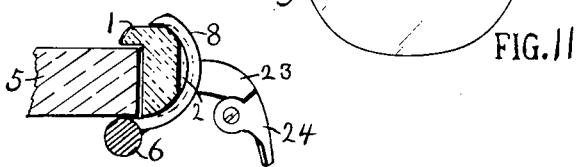
Figure 13 is a view similar to Figure 12 showing another modification.

In Figure 13 is shown an endpiece 23 attached to the bracket 8. A temple 24 is connected to the endpiece 23. In the other forms the temple is attached to the end piece on the rim member 1 by means of a hinge (not shown) in the conventional manner.

It is preferable to use a pliable material for the rim members such as plastics now used in the manufacture of eyeglass frames. Other pliable materials can be used.

Although the spring auxiliary rim member is shown positioned at the rear of the lens, it can be positioned at the front of the lens in which case the brackets would extend rearwardly and the grooves in the rim member would be rearranged.

The notches in the rim members may be formed having upper and lower diverging wall portions and the brackets being constructed so that only spaced upper and lower portions are in contact therewith. This arrangement maintains the rim member against a rocking movement relative to the auxiliary rim member. Similarly the notches in the lenses may be formed having upper and lower diverging wall portions and the elevations in the rim member being formed so that only spaced upper and lower portions are in contact therewith.

The preferred form of having the notch in the rim member is shown in Figure 2, in which only spaced forward and rearward portions of the bracket are in contact with spaced forward and rearward wall portions of the notch, whereby the bracket is maintained against rocking movement due to wear.

In the several views applicant has shown some of the preferred arrangements and does not limit himself to these applications. It is to be understood that other modifications might be conceived embodying the general principles of the invention. From the foregoing description and accompanying drawing it is apparent that I have provided an ophthalmic mounting in accordance with the objects of this invention.

I claim:

1. An ophthalmic device comprising a pair of non-metallic rim members having a groove extending along the inner surface thereof to hold a pair of lenses therein, each of said non-metallic rim members being arranged to extend along the top and partially along the side edges of a lens to points below the greatest horizontal dimension thereon, the side portions of said non-metallic rim members converging toward the bottom thereof and provided with notches in the outer surface at points below the greatest horizontal dimension of the lenses mounted in said non-metallic rim members, a pair of spring metallic rim members, each of said metallic rim members being positioned along one surface of each of said non-metallic rim members and arranged to extend along the upper and side portions thereof, each of the side portions of said metallic rim members converging toward the bottom and extending to points below the greatest horizontal dimension of the lenses mounted in said non-metallic rim members, a pair of brackets being attached to the side portions of said metallic rim members and arranged to releasably engage the notches in the side portions of said non-metallic rim members, said metallic rim members being under partial tension whereby the brackets urge and maintain such portions of the converging side portions of said non-metallic rim members below the greatest horizontal dimension of the lenses mounted therein against the corresponding side edges of the lenses, releasably securing the lenses therein.

2. An ophthalmic device comprising a pair of non-metallic rim members having a groove extending along the inner surface thereof to hold a pair of lenses therein, each of said non-metallic rim members being arranged to extend along the top and partially along the side edges of a lens to points below the greatest horizontal dimension thereon, the side portions of said non-metallic rim members converging toward the bottom thereof and provided with notches in the outer surface at points below the greatest horizontal dimension of the lenses mounted in said non-metallic rim members, a pair of spring metallic rim members, each of said metallic rim members being positioned along one surface of each of said non-metallic rim members and arranged to extend along the upper and side portions thereof, the side portions of said metallic rim members converging toward the bottom and extending to points below the greatest horizontal dimension of the lenses mounted in said non-metallic rim members, a pair of brackets being attached to the side portions of said metallic rim members and arranged to releasably engage the notches in the side portions of said non-metallic rim members, at least the brackets at the nasal sides thereof being substantially flush with the confronting surfaces of the nasal side portions of said non-metallic rim members adjacent the nose bearing surfaces of the nose so that such surfaces may bear against the nose bearing surfaces of the nose, said metallic rim members being under partial tension whereby the brackets will urge such portions of the nasal and temporal side portions of said non-metallic rim members below the greatest horizontal dimension thereon against the corresponding side edges of lenses mounted therein thereby forcing the relatively long top edge portion of the lenses against the corresponding portions of the non-metallic rim members whereby the lenses are held against a rotating movement and releasably secured therein.

3. An ophthalmic device comprising a pair of non-metallic rim members having a groove extending along the inner surface thereof to hold a pair of lenses therein, each of said non-metallic rim members being arranged to extend along the top and partially along the side edges of a lens to points below the greatest horizontal dimension thereon, the side portions of said non-metallic rim members converging toward the bottom thereof and provided with notches in the outer surface at points below the greatest horizontal dimension of the lenses mounted in said non-metallic rim members, a pair of spring metallic rim members, each of said metallic rim members being positioned along one surface of each of said non-metallic rim members adjacent the inner peripheral edge thereof, and arranged to extend along the upper and side portions thereof, the side portions of said metallic rim members being provided with releasable attaching means for attachment to said non-metallic rim members, said releasable attaching means comprising an arm extending from said metallic rim member along the surface of said non-metallic rim member toward the outer peripheral edge of the side portion thereon and arranged to releasably engage the notch provided in the outer wall portion thereof, said metallic rim members being under partial tension whereby the attaching means will urge such portions of the non-metallic rim members below the greatest horizontal dimension of lenses mounted therein against the corresponding side edges of the lenses, releasably securing the lenses therein.

References Cited in the file of this patent

UNITED STATES PATENTS

| | | |
|---|---|---|
| 1,394,109 | Narum | Oct. 18, 1921 |
| 2,240,725 | Styll | May 6, 1941 |
| 2,254,746 | Line | Sept. 2, 1941 |
| 2,383,572 | Splaine et al. | Aug. 28, 1945 |
| 2,389,742 | Rey | Nov. 27, 1945 |
| 2,439,357 | Bouchard | Apr. 6, 1948 |
| 2,450,711 | Bouchard | Oct. 5, 1948 |
| 2,524,140 | Retz | Oct. 3, 1950 |
| 2,585,352 | Silverman | Feb. 12, 1952 |
| 2,586,546 | Longnecker | Feb. 19, 1952 |
| 2,588,505 | Ellis | Mar. 11, 1952 |

FOREIGN PATENTS

| | | |
|---|---|---|
| 965,781 | France | Feb. 22, 1950 |
| 968,497 | France | Apr. 26, 1950 |
| 976,822 | France | Nov. 1, 1950 |
| 977,995 | France | Nov. 22, 1950 |